(12) United States Patent  
Hsieh et al.

(10) Patent No.: US 8,118,270 B2
(45) Date of Patent: Feb. 21, 2012

(54) DISK DRIVE ASSEMBLY

(75) Inventors: Kun-Chi Hsieh, Taipei Hsien (TW); Cheng-Yu Jiang, Shenzhen (CN); Li Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/955,928

(22) Filed: Nov. 30, 2010

(65) Prior Publication Data

US 2012/0006955 A1 Jan. 12, 2012

(30) Foreign Application Priority Data

Jul. 9, 2010 (CN) .......................... 2010 1 0221850

(51) Int. Cl.
H05K 5/00 (2006.01)
(52) U.S. Cl. .................. 248/220.21; 248/27.1; 248/918; 361/679.33; 361/727; 312/223.1; 312/223.2
(58) Field of Classification Search ............. 248/220.21, 248/551, 220.22, 222.13, 223.31, 225.11, 248/225.21, 918, 27.1; 361/679.33, 679.37, 747, 727; 312/332.1, 223.1, 223.2
See application file for complete search history.

(56) References Cited

U.S. PATENT DOCUMENTS

| | | | |
|---|---|---|---|
| 6,853,547 B2 * | 2/2005 | Williams et al. ......... | 361/679.33 |
| 6,944,016 B2 * | 9/2005 | Chen et al. ............... | 361/679.33 |
| 6,978,903 B2 * | 12/2005 | Son et al. ........................ | 211/26 |
| 7,441,744 B2 * | 10/2008 | Chen et al. .................... | 248/694 |
| 7,542,271 B2 * | 6/2009 | Chen et al. ............... | 361/679.33 |
| 7,787,244 B1 * | 8/2010 | Liu ............................ | 361/679.33 |
| 2007/0194197 A1 * | 8/2007 | Huang et al. ............... | 248/309.1 |
| 2008/0057781 A1 * | 3/2008 | Chen et al. .................... | 439/577 |
| 2010/0142159 A1 * | 6/2010 | Lee et al. ...................... | 361/747 |

* cited by examiner

*Primary Examiner* — Anita M King
(74) *Attorney, Agent, or Firm* — Altis Law Group, Inc.

(57) ABSTRACT

A mounting apparatus includes a mounting bracket and a securing element. The mounting bracket is configured to receive a disk drive. The securing element is slidably mounted to the mounting bracket. The securing element includes a stopping portion. The securing element is configured to slide along a first direction to engage the disk drive to prevent the disk drive from moving along a second direction that is substantially perpendicular to the first direction. The stopping portion is configured to block the mounting bracket to prevent the securing element from sliding out of the mounting bracket along a third direction that is opposite to the first direction.

19 Claims, 5 Drawing Sheets

DISK DRIVE ASSEMBLY

BACKGROUND

1. Technical Field

The present disclosure relates to a disk drive assembly.

2. Description of Related Art

Often, at least one disk drive is secured in a housing of a computer for data storage, conventionally secured therein by a plurality of screws. The screws are small, however, and during installation or removal are easily dropped into the computer enclosure, which may result in damage.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
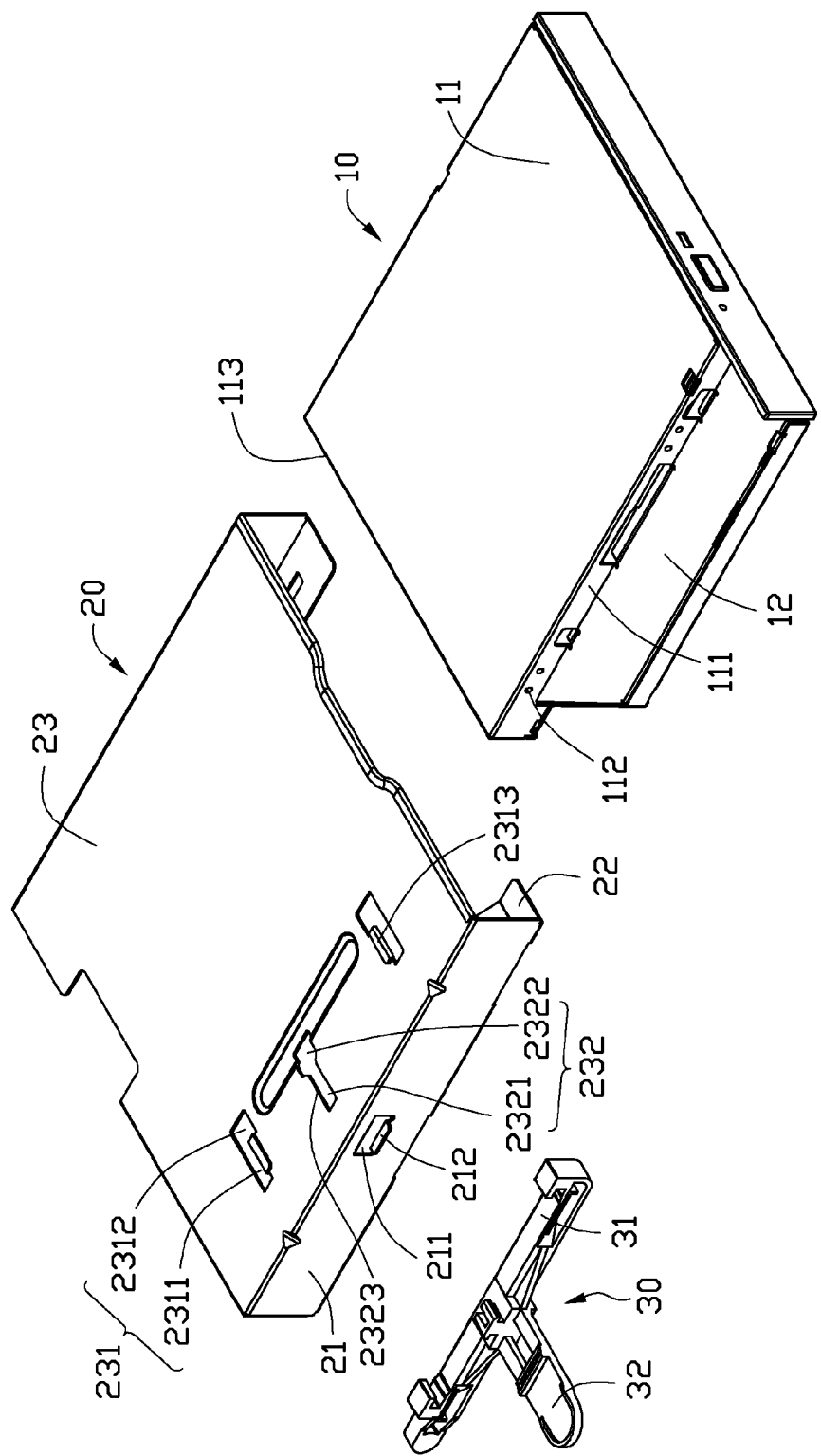
FIG. 1 is an exploded, isometric view of a disk drive assembly of an embodiment, including a securing element and a mounting bracket.
Figure 2:
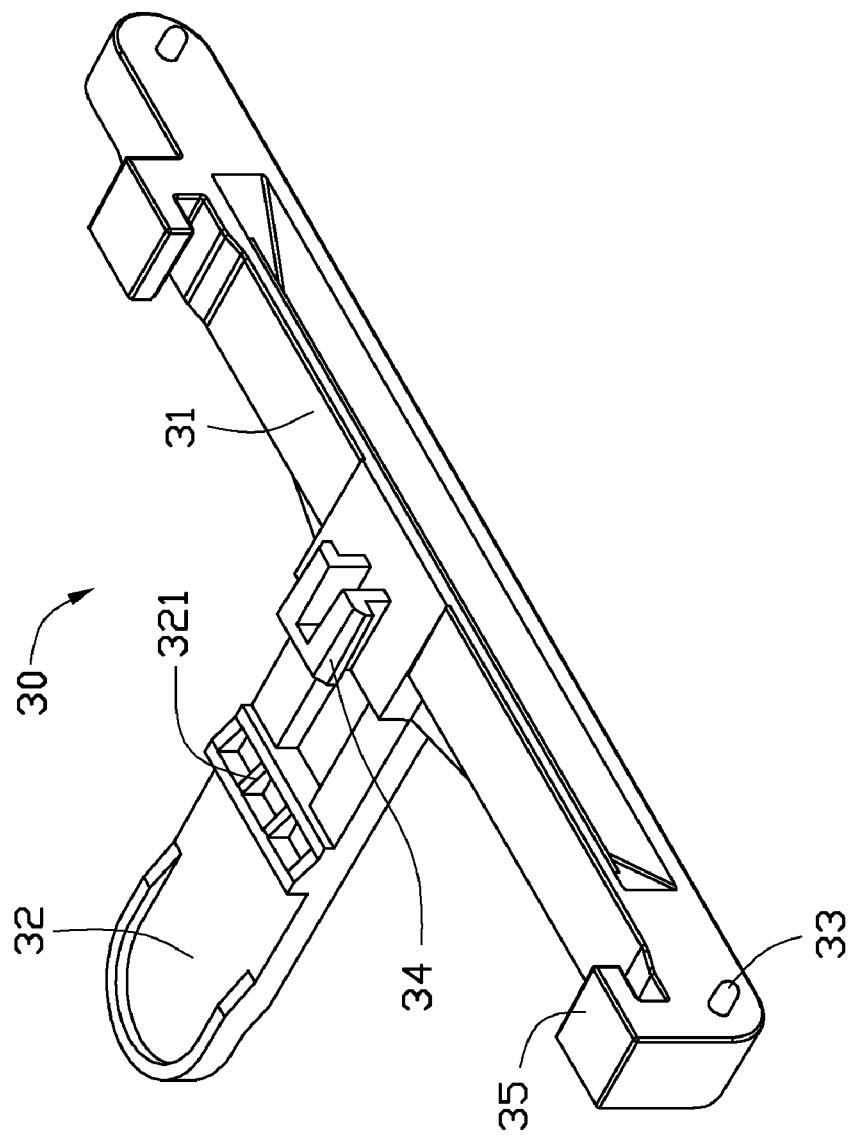
FIG. 2 is an isometric view of the securing element of FIG. 1.
Figure 3:
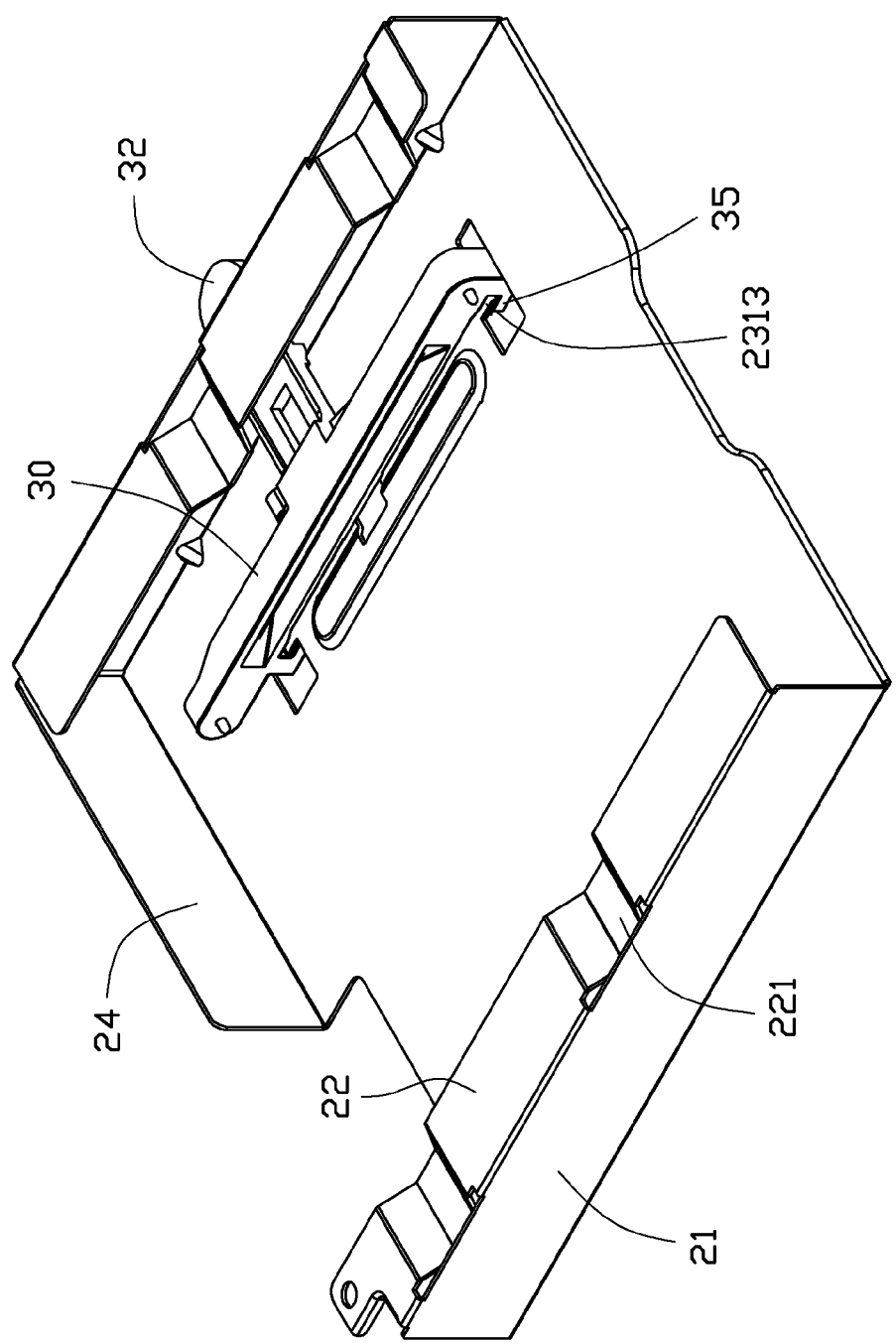
FIG. 3 is an assembled view of the mounting bracket and the securing element of FIG. 1.
Figure 4:
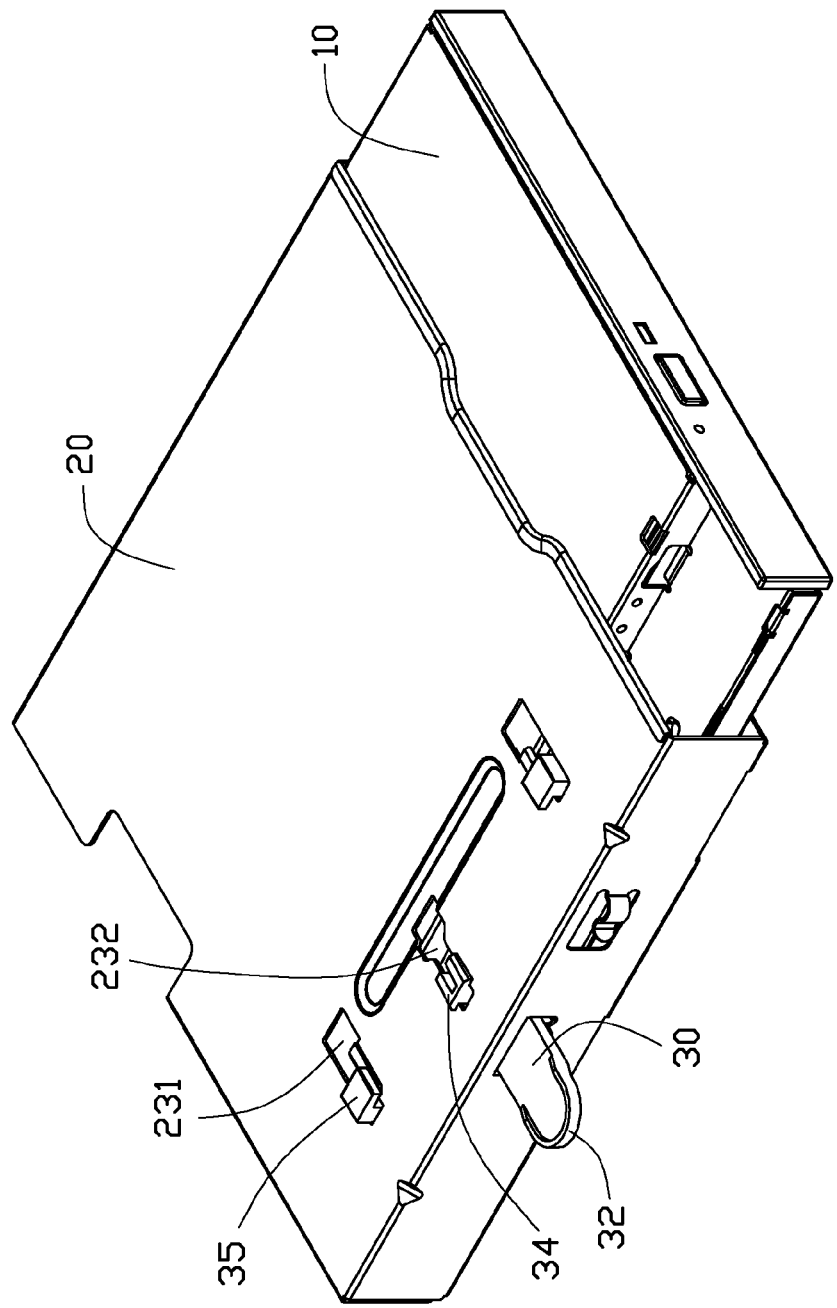
FIG. 4 is a pre-assembly view of FIG. 1.
Figure 5:
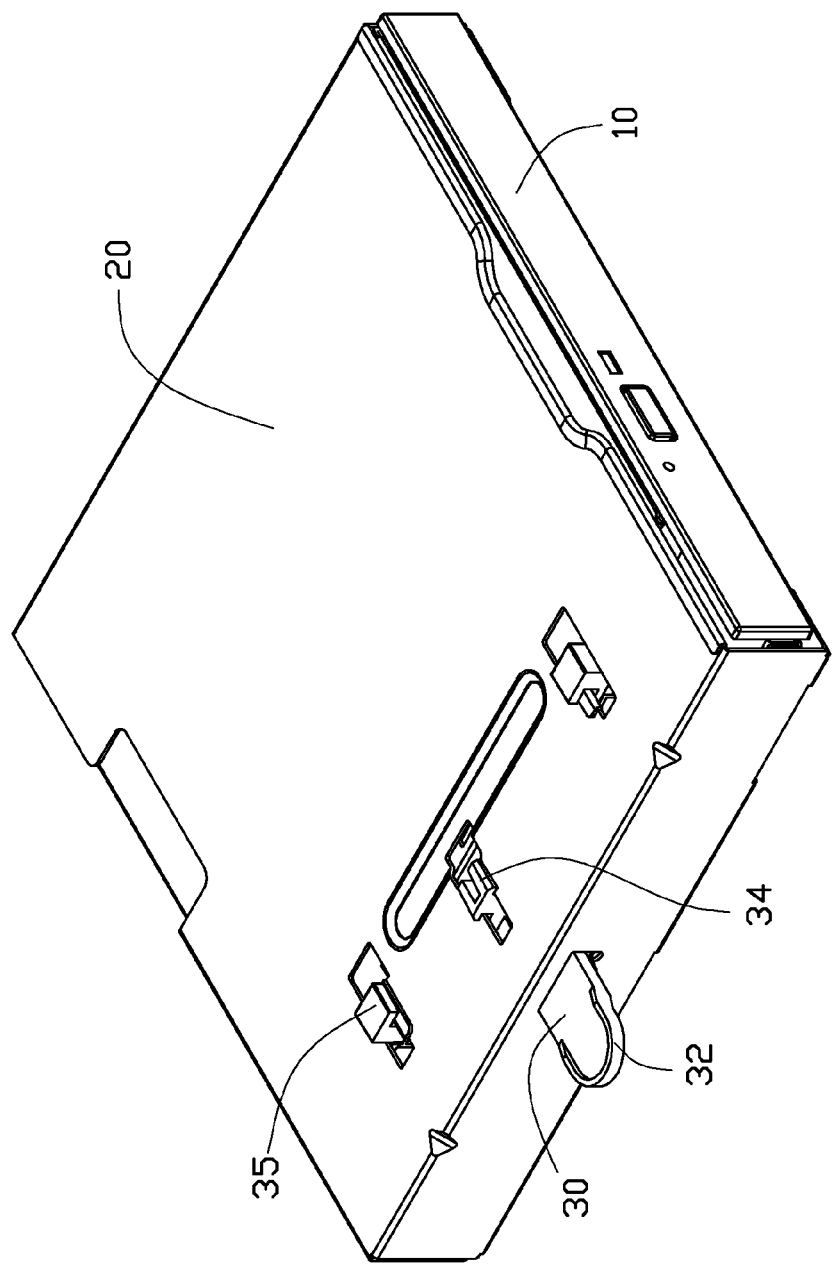
FIG. 5 is an assembled view of FIG. 1.

Referring to FIGS. 1 through 3, a disk drive assembly includes a disk drive 10, a mounting bracket 20, and a securing element 30.

The disk drive 10 includes a disk drive body 11 and an extending portion 12 extending from the disk drive body 11. The extending portion 12 is thinner than the disk drive body 11. The disk drive body 11 defines a side surface 111 connected to the extending portion 12. Two securing holes 112 are defined in the side surface 111. The disk drive body 11 defines a rear side 113.

The mounting bracket 20 includes two parallel side panels 21, a top panel 23 connected between the two side panels 21, and a rear panel 24 extending perpendicularly from the top panel 23. The rear panel 24 is perpendicular to the side panels 21. The side panels 21 are parallel to the side surface 111. A supporting portion 22 extends from each side panel 21 towards the other side panel 21. An opening 211 is defined in one of the side panels 21. A tab 212 extends from one side of the opening 211. Each supporting portion 22 includes two protrusions 221. A first mounting opening 232 is defined in the top panel 23. The first mounting opening 232 includes a first narrow part 2321 and a first wide part 2322 connected to the narrow part 2321. The first narrow part 2321 defines opposite side edges 2323. Two second mounting openings 231 are defined in the top panel 23 and disposed in opposite sides of the first mounting opening 232. Each second mounting opening 231 includes a second narrow part 2311 and a second wide part 2312 connected to the second narrow part 2311. The second narrow part 2311 defines an edge 2313 adjacent to the first mounting opening 232.

The securing element 30 includes a base 31 and a handle 32 extending from the base 31. The securing element 30 includes a T-shaped first sliding portion 34 extending from a middle portion of the base 31. The first sliding portion 34 is configured to be slidably mounted in the first mounting opening 232. The securing element 30 includes two second L-shaped sliding portions 35 disposed on opposite sides of the first sliding portion 34. The second sliding portions 35 are configured to be slidably mounted in the second mounting opening 231. The securing element 30 includes two columnar protrusions 33 extending from the base 31. The securing element 30 includes a resilient stopping portion 321 configured to prevent the handle 32 from sliding out of the opening 211.

Referring to FIGS. 1 to 5, in assembly, the handle 32 of the securing element 30 extends through the opening 211 of the mounting bracket 20. During this process, the stopping portion 321 is resiliently deformed to extend through the opening 211 with handle 32. The first sliding portion 34 and the second sliding portions 35 extend through the first wide part 2322 of the first mounting opening 232 and the second wide part 2312 of the second mounting opening 231. At this time, the handle 32 is supported on the tab 212 of the side panel 21. The handle 32 is pulled outward until the stopping portion 321 reaches the opening 211. At this time, the first sliding portion 34 slides to the first narrow part 2321 of the first mounting opening 232, and the second sliding portions 35 slide to the second narrow parts 2311 of the second mounting opening 231. The first sliding portion 34 is disposed on the opposite side edges 2323 of the first narrow part 2321. The second sliding portions 35 are disposed on the edges 2313 of the second narrow parts 2311. The disk drive 10 is placed on the supporting portions 22 of the mounting bracket 20. The disk drive 10 is pushed inward until the rear portion 113 of the disk drive 10 contacts the rear panel 24. At this time, the securing holes 112 of the disk drive 10 are aligned with the protrusions 33 of the securing element 30. The securing element 30 is pushed towards the disk drive 10 in a direction perpendicular to the side panel 21. The protrusions 33 of the securing element 30 are driven to be received in the corresponding securing holes 112, thereby securing the disk drive 10 in the mounting bracket 20. At this time, the base 31 of the securing element 30 is disposed on the extending portion 12 of the disk drive 10.

During removal, the handle 32 of the securing element 30 is withdrawn from the disk drive 10 to enable the protrusions 33 to disengage from the securing holes 112. The disk drive 10 moves outward to separate from the mounting bracket 20.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a mounting bracket configured to receive a disk drive; and
a securing element, the securing element slidably mounted to the mounting bracket, the securing element comprising a stopping portion, the securing element configured to slide along a first direction to engage the disk drive to prevent the disk drive from moving along a second direction that is substantially perpendicular to the first direction; and the stopping portion is configured to block the mounting bracket to prevent the securing element from sliding out of the mounting bracket along a third direction that is opposite to the first direction.

2. The mounting apparatus of claim 1, wherein a first mounting opening is defined in the mounting bracket, and the securing element comprises a first sliding portion mounted in the first mounting opening.

3. The mounting apparatus of claim 2, wherein the first mounting opening comprises a wide part and a narrow part, connected to the wide part; and the first sliding portion is configured to extend through the wide part to slide to the narrow part.

4. The mounting apparatus of claim 3, wherein the first sliding portion is T-shaped, two sides of the first sliding portion are configured to be disposed on opposite side edges of the narrow part to prevent the first sliding portion from be separated from the narrow part.

5. The mounting apparatus of claim 3, wherein the first sliding portion is L-shaped, a side of the first sliding portion are configured to be disposed on an edge of the narrow part to prevent the first sliding portion from be separated from the narrow part.

6. The mounting apparatus of claim 2, wherein the securing element comprises two second sliding portions disposed on opposite sides of the first sliding portion, and two second mounting openings are defined in the mounting bracket corresponding to the two second sliding portions.

7. The mounting apparatus of claim 2, wherein the mounting bracket comprises a side panel, and a top panel substantially perpendicular to the side panel; and the first mounting opening is defined in the top panel.

8. The mounting apparatus of claim 1, wherein the mounting bracket comprises a side panel; an opening is defined in the side panel; the securing element comprises a handle extending through the opening; and the handle is configured to be driven to enable the securing element to slide relative to the mounting bracket.

9. The mounting apparatus of claim 8, wherein the stopping portion is located on the handle.

10. The mounting apparatus of claim 1, wherein the securing element comprises a base, a handle extending from the base, and a protrusion extending from the base; the handle and the protrusion are disposed on opposite sides of the base; the handle is configured to be driven to enable the securing element to slide relative to the mounting bracket; and the protrusion is configured to engage a securing hole of the disk drive.

11. A mounting apparatus for a disk drive, comprising:
 a mounting bracket, the mounting bracket comprising a side panel; and
 a securing element, the securing element slidably mounted to the mounting bracket, the securing element comprising a stopping portion, the securing element configured to slide along a first direction substantially perpendicular to the side panel and to engage the disk drive to prevent the disk drive from moving along a second direction substantially parallel to the side panel; and the stopping portion is configured to block the mounting bracket to prevent the securing element from sliding out of the mounting bracket along a third direction opposite to the first direction.

12. The mounting apparatus of claim 11, wherein a first mounting opening is defined in the mounting bracket, and the securing element comprises a first sliding portion mounted in the first mounting opening.

13. The mounting apparatus of claim 12, wherein the first mounting opening comprises a wide part and a narrow part connected to the wide part, and the first sliding portion is configured to extend through the wide part to slide to the narrow part.

14. The mounting apparatus of claim 13, wherein the first sliding portion is T-shaped, two sides of the first sliding portion are configured to be disposed on opposite side edges of the narrow part to prevent the first sliding portion from separating from the narrow part.

15. The mounting apparatus of claim 13, wherein the first sliding portion is L-shaped, a side of the first sliding portion are configured to be disposed on an edge of the narrow part to prevent the first sliding portion from separating from the narrow part.

16. The mounting apparatus of claim 12, wherein the securing element comprises two second sliding portions disposed on opposite sides of the first sliding portion, and two second mounting openings are defined in the mounting bracket corresponding to the two second sliding portions.

17. The mounting apparatus of claim 12, wherein the mounting bracket further comprises a top panel substantially perpendicular to the side panel, and the first mounting opening defined in the top panel.

18. The mounting apparatus of claim 11, wherein an opening is defined in the side panel; the securing element comprises a handle extending through the opening; and the handle is configured to be driven to enable the securing element to slide relative to the mounting bracket.

19. The mounting apparatus of claim 18, wherein the stopping portion is located on the handle.

* * * * *